United States Patent [19]

Sugiyama

[11] Patent Number: 4,811,969
[45] Date of Patent: Mar. 14, 1989

[54] APPARATUS FOR CONTROLLING A STEERING ANGLE OF A REAR WHEEL

[75] Inventor: Mizuho Sugiyama, Toyota, Japan

[73] Assignee: Toyota Jidosha Kabushiki Kaisha, Japan

[21] Appl. No.: 60,002

[22] Filed: Jun. 9, 1987

[30] Foreign Application Priority Data

Jun. 20, 1986 [JP] Japan .................. 61-145819

[51] Int. Cl.⁴ .............................................. B60G 21/00
[52] U.S. Cl. ........................................ 280/701; 280/91
[58] Field of Search ..................... 280/91, 99, 661, 701

[56] References Cited

U.S. PATENT DOCUMENTS

| 4,483,547 | 11/1984 | Furukawa | 280/91 |
| 4,519,627 | 5/1985 | Shibahata et al. | 280/701 |
| 4,557,493 | 12/1985 | Sano | 280/91 |
| 4,613,144 | 9/1986 | Furukawa | 280/91 |

FOREIGN PATENT DOCUMENTS

| 96372 | 12/1983 | European Pat. Off. . | |
| 52-61024 | 5/1977 | Japan . | |
| 55-91457 | 7/1980 | Japan . | |
| 56-167562 | 12/1981 | Japan . | |
| 214469 | 12/1983 | Japan . | |
| 214470 | 12/1983 | Japan . | |
| 192773 | 12/1983 | Japan . | |
| 58-214469 | 12/1983 | Japan . | |
| 58-192773 | 12/1983 | Japan . | |
| 59-23716 | 2/1984 | Japan . | |
| 59-227565 | 12/1984 | Japan . | |
| 60-15051 | 2/1985 | Japan . | |
| 189677 | 9/1985 | Japan | 280/91 |
| 60-138815 | 9/1985 | Japan . | |
| 60-193780 | 10/1985 | Japan . | |
| 67670 | 4/1986 | Japan | 280/91 |
| 64584 | 4/1986 | Japan | 280/91 |

Primary Examiner—David M. Mitchell
Assistant Examiner—Ross Weaver
Attorney, Agent, or Firm—Parkhurst, Oliff & Berridge

[57] ABSTRACT

This invention provides an apparatus for controlling the steering angle of a rear wheel in which a vehicle speed and a steering angle of a front wheel are detected and a rear wheel is controlled to toe-in in response to the vehicle speed and steering angle of the front wheel during high speed turning. Turning stability and control during high speed turning is improved.

5 Claims, 10 Drawing Sheets

APPARATUS FOR CONTROLLING A STEERING ANGLE OF A REAR WHEEL

BACKGROUND ART

1. Field of the Invention

The present invention relates to an apparatus for controlling a steering angle of a rear wheel of a vehicle in response to the vehicle's speed and the steering angle of a front wheel.

2. Prior Art

A method for controlling four wheel steering has been proposed and developed (Published Unexamined Patent Application sho No. 52-61024). For example, in methods (Published Unexamined Patent Application sho Nos. 55-91457 and 56-167562), front wheels and rear wheels are controlled in reverse phase during low speed turning, or in the same phase during high speed turning to turn independently so that the turning radius is small during low speed turning and quick turning is obtained, and vehicle rear body swing is prevented during high speed turning, resulting in stable steering.

Although these methods generate an inward cornering force, by controlling front and rear wheels to turn at the same phase to prevent the above rear body swing, the cornering force makes turning performance undesirable during high speed turning.

SUMMARY OF THE INVENTION

A first object of the present invention is to provide an apparatus for controlling the steering angle of a rear wheel by which turning performance during high speed turning is improved.

A second object of the present invention is to provide an apparatus for controlling the steering angle of a rear wheel by which turning stability during high speed turning is attained as with prior four wheel steering configurations.

third object of the present invention is to provide an apparatus for controlling the steering angle of a rear wheel by which turning control is superior to that of roll steer, which a rolling of a vehicle incidentally causes as a streering effect.

In accordance with the present invention, as shown in FIG. 1, when a vehicle speed is a predetermined value or more(P1), the rear wheel is controlled to toe-in in response to both the vehicle speed and the steering angle of the front wheel(P2).

When the vehicle turns at a high speed which equals or exceeds a predetermined value, the rear wheel is set to toe-in. During the initial period of turning ( before load transference between left and right wheels has occurred ), the directions of the respective cornering forces responding to the slippage angle ( the angle caused by a wheel slipping out of course which the wheel is controlled to forward on, by the centripetal force during turning )of rear left and right wheels are opposed, and both forces cancel one another out. During the middle through the last period of turning from start of load transference between right and left wheels until the end thereof ), the load is applied to the outside turning wheel and turning is under control of the cornering force based upon the slippage angle thereof, resulting in good drivability similar to that of prior four wheel steering configulations in which front and rear wheels are in the same phase.

BRIEF DESCRIPTION OF DRAWINGS

The present invention may be best understoodwith reference to the following description of the preferred embodiments and the drawings in which.

DETAILED DESCRIPTION OF PREFERRED EMBODIMENTS

Figure 1:
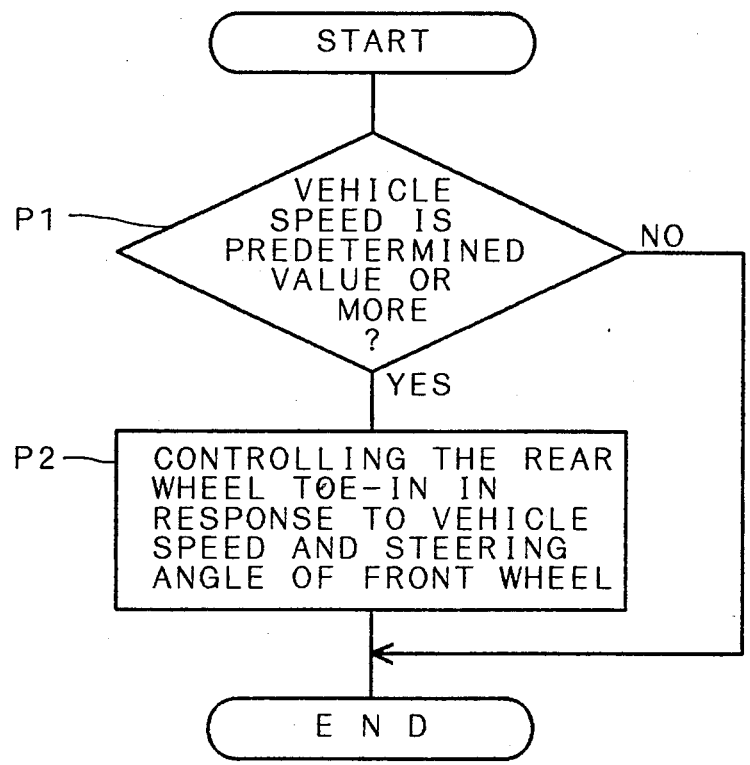
FIG. 1 is a flow chart showing the basic process steps according to the present invention.
Figure 2:
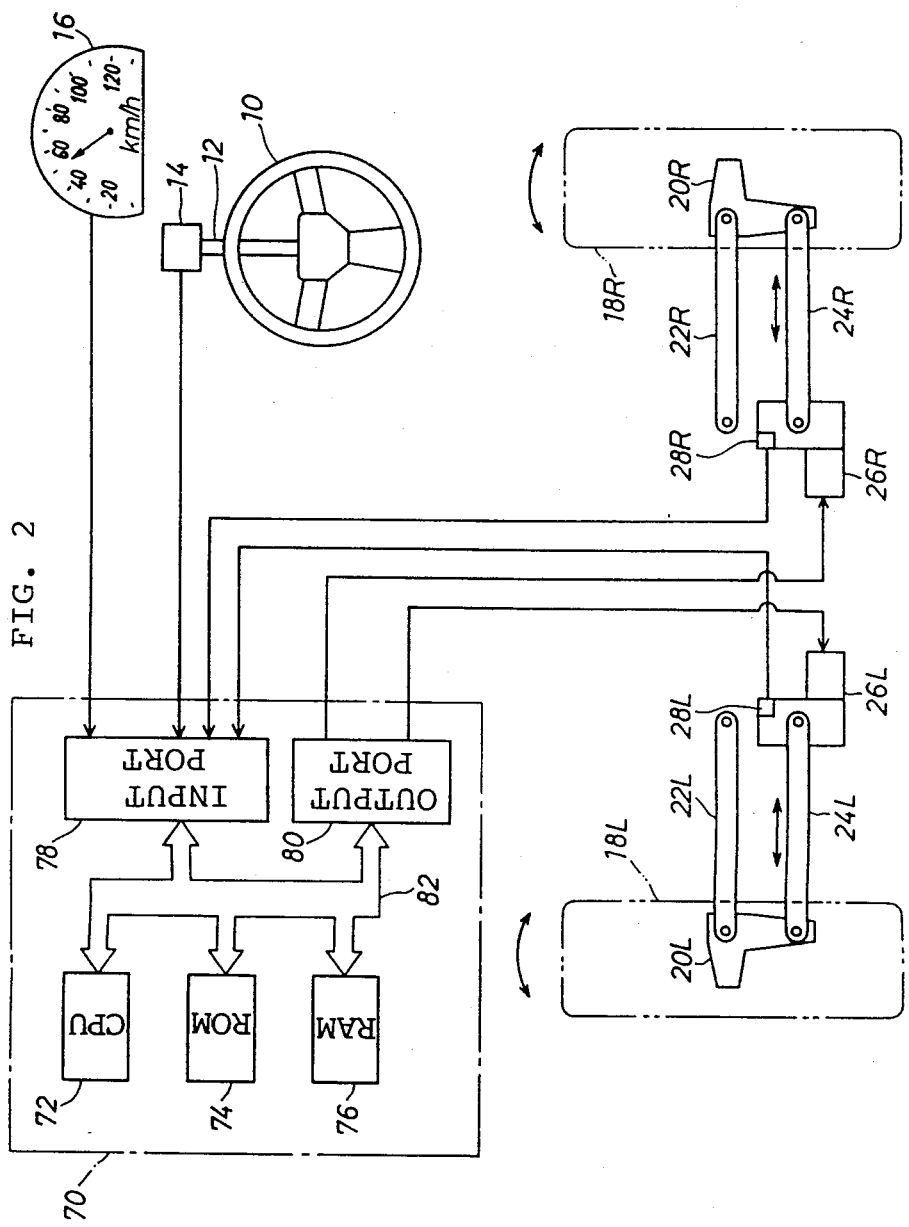
FIG. 2 is a system diagram showing the apparatus for a rear steering wheel and the peripheral equipment of a vehicle according to a first embodiment.

FIG. 2 is a system diagram showing the apparatus for a rear steering wheel and the peripheral equipment of a vehicle according to a first embodiment. The rotational angle of a steering column 12 , which is responsive to a steering wheel 10, is detected by a steering angle sensor 14. The rotational angle represents the front steering angle $\theta f$ (not shown). A vehicle speed is detected by a vehicle speed sensor 16 provided on an instrument panel.

A rear left wheel 18L is provided with a wheel support member 20L, an axle of which is connected to one end of a first arm 22L, one end portion of which is connected to a second arm 24L. The other end of the second arm 24L is connected to a steering wheel actuator 26L for the rear left wheel. Rightward and leftward movement of the second arm 24 L enables the rear left wheel 18L to turn. The steering actuator 26L has a left steering wheel sensor 28L which detects a steering angle Ar1 at the rear left wheel. A rear right wheel 18R has similar construction to the rear left wheel 18L so that the numerals correspond with one another, by interchanging L and R.

Figure 3A:
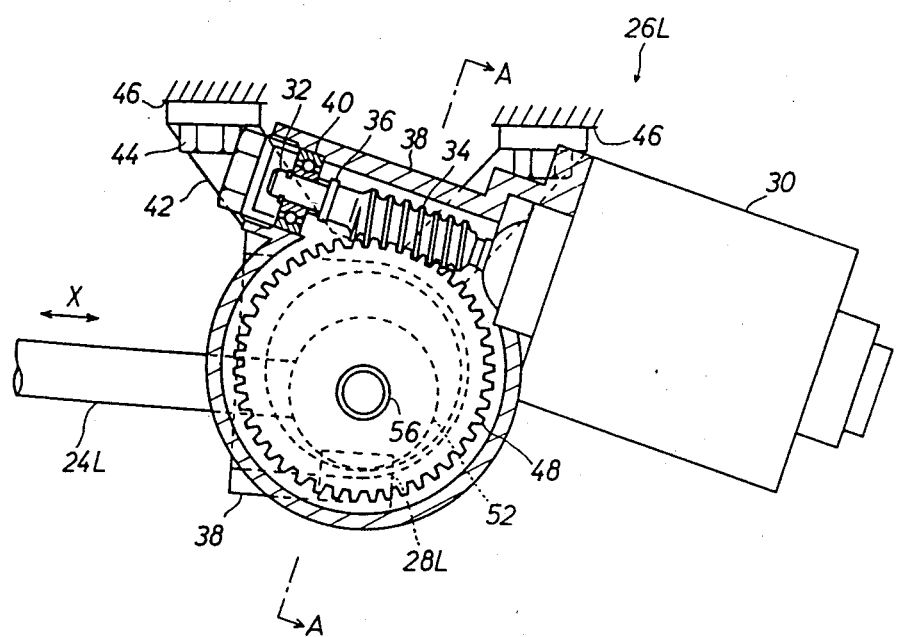
FIG. 3A is an elevational view in partial section showing an actuator of rear and left wheels for controlling a steering angle according to the first embodiment.
Figure 3B:
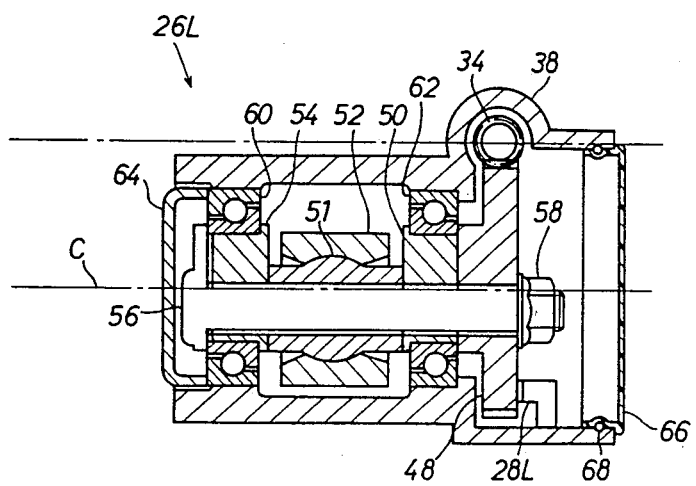
FIG. 3B is a sectional view along line A—A in FIG. 3A.

FIG. 3A is an elevational view in partial section showing the actuator 26L according to the first embodiment. FIG. 3B is a sectional view along line A-A in FIG. 3A. A worm 34 is mounted on the rotational axle 32 of a motor 30 by a pin 36. One end of the axle 32 is rotatively supported by a radial bearing 40 attached to a housing 38 which is mounted on a body 46 through a bracket 42 by a bolt 44. The worm 34 engages with a worm wheel 48. A shaft 56 penetrates the worm wheel 48, an eccentric cam 50 and 54, a pillow ball inner cylinder 51, being clamped by a nut 58. The shaft 56 is eccentric to the center C of the worm wheel 48, and to the cams 50 and 54. A pillow ball outer cylinder 52 is mounted on the cam 51. The second arm 24L is attached to the peripheral surface of the cylinder 52 by welding. The cam 54 is rotatively supported by a first angular contact bearing 60, and similarly, the cam 50 by a second angular contact bearing 62. The nut 64 is screwed into one free end of the housing 38 and a cap 66 is mounted into an opposite free end thereof. An O-ring 68 is provided at an inner peripheral surface of the housing 38 corresponding to a peripheral surface of the cap 66.

Upon activation of motor 30, the worm 34 rotates and the worm wheel 48, the cam 50, the cylinder 51 and the cam 54 rotate around the central axis. The second arm 24L moves in the X direction and the end portion thereof moves in the vertical direction thereby varying the roll steer. This movement is detected by the sensor 28L which is provided at the housing 38 in the vicinity of worm wheel 48. The sensor 28L is of a type having a light emitting and receiving element. Light reflecting paper having light reflecting elements at predetermined intervals is attached over an end surface of the worm wheel 48. Alternatively, magnets may be embedded in the end surface of the worm wheel 48 at predetermined intervals and the rotational angle thereof is detected by an impedance change within sensor 28L thereby determining the amount of motion of the arm 24L.

The construction of a steering wheel actuator of the rear right wheel 26R is similar to that of the actuator 26L.

Referring now to FIG. 2, an electronic control unit (ECU) 70, which controls the steering angle of the rear left and right wheels 18L and 18R, comprises a central processing unit (CPU) 72, a read only memory (ROM) 74, a random access memory (RAM) 76, an input port 78, an output port 80, and a common bus 82 which inter-connects the above elements. The ECU 70 receives at the input port 78 the signals of a steering angle sensor 14, a vehicle speed sensor 16 and the sensors 28L and 28R and outputs the control signals from the output port 80 to the actuators 26L and 26R.

Figure 4:
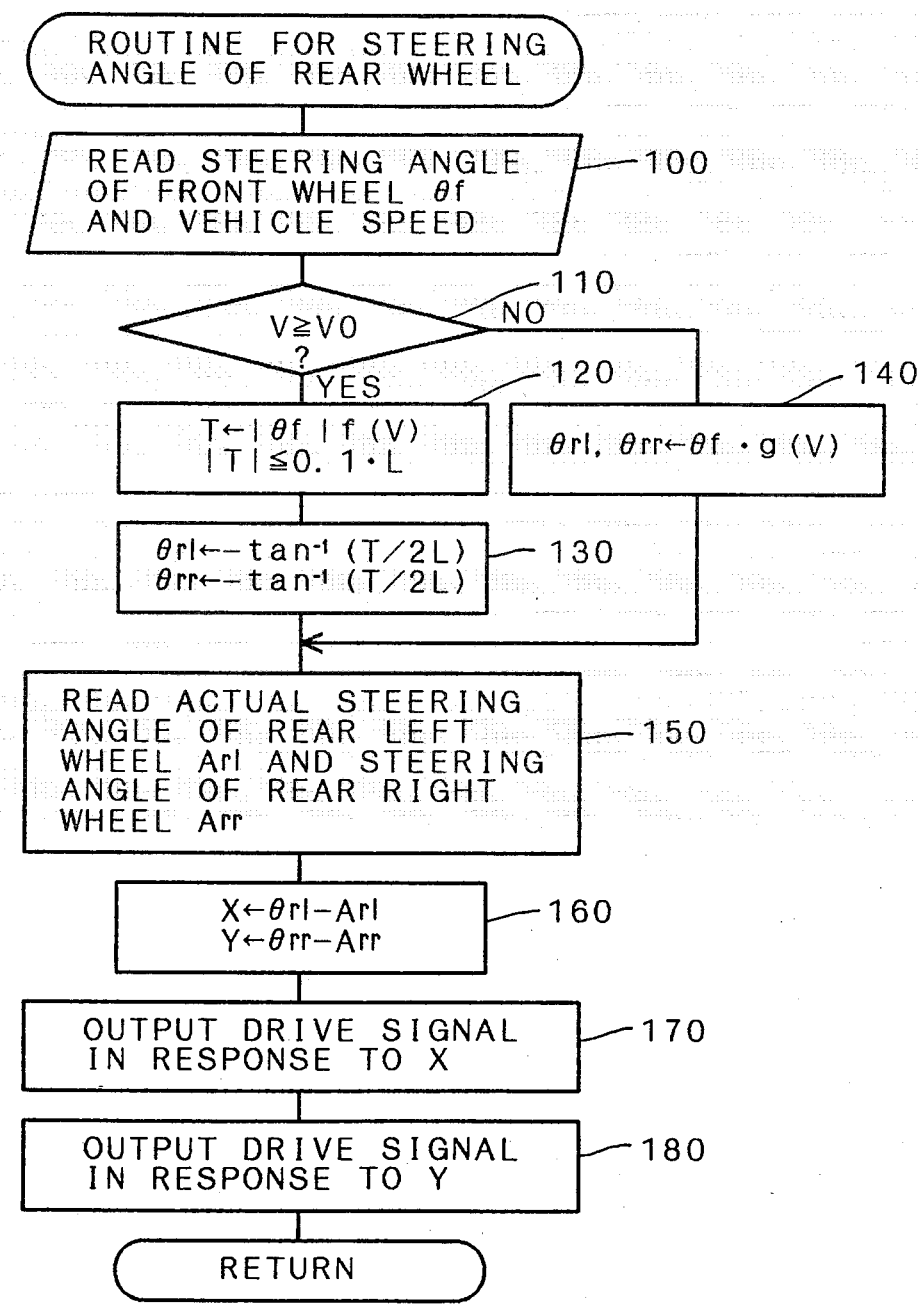
FIG. 4 is a flow chart showing a routine for controlling the steering angle of a rear wheel as executed by an electronic control unit.
Figure 5:
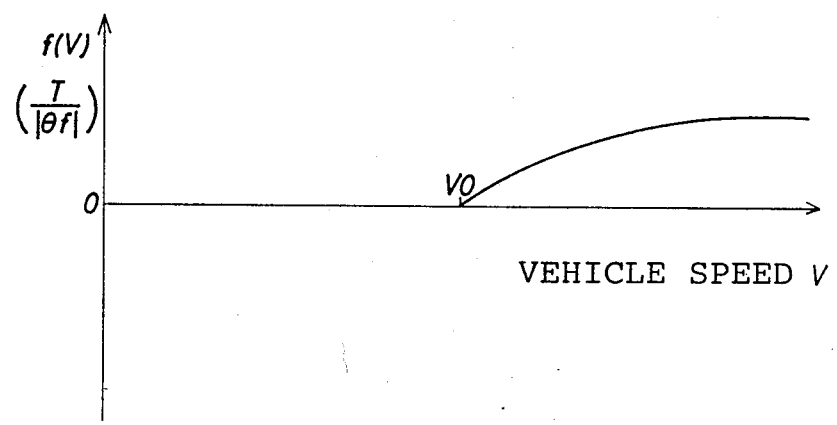
FIG. 5 is a graph showing a function f(v).
Figure 6:
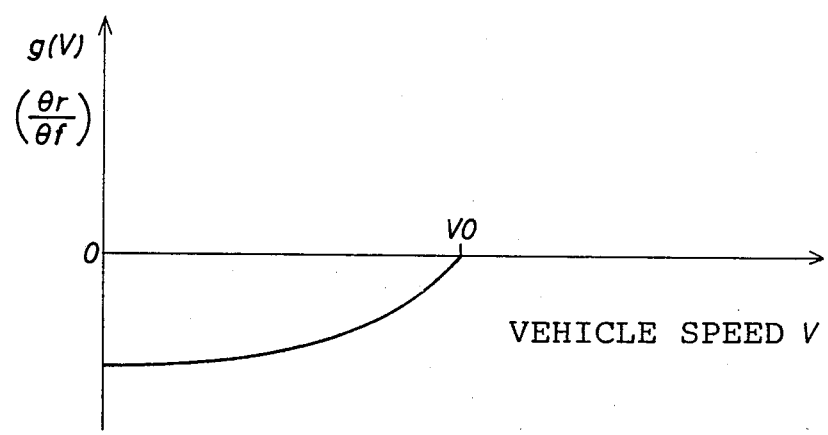
FIG. 6 is s graph showing a function g(v).

FIG. 4 is a flow chart showing a routine for controlling the steering angle of a rear wheel as executed by the ECU 70. At step 100, the front steering angle $\theta f$ detected by the steering angle sensor 14 and a vehicle speed V detected by the sensor 16, are read. At subsequent step 110, it is determined whether or not the vehicle speed V is a predetermined speed V0 or more. If the determination is YES, the program proceeds to step 120 where T is set equal to the front steering angle $\theta f$ read at step 100 multiplied by a predetermined function f(v). The toe quantity T is set equal to a-b, wherein "a" is a first interval between the back of the rear right and left wheels, and "b" is a second interval between the front of the rear right and left wheels. T is positive during a toe-in condition. FIG. 5 is a graph showing a function f(v) which is positive while the vehicle speed V is a predetermined speed V0 or more, and which increases in accordance thereto. The toe quantity T is determined to increase in response to an increase in the vehicle speed V and the front steering angle $\theta f$, and is limited not to exceed an absolute value of 0.1L, where L represents the rear wheel diameter.

At subsequent step 130, the rear left angle $\theta rl$ and the rear right angle $\theta rr$ which can be within the toe quantity are computed as follows.

$\theta rl = -\tan^{-1}(T/2L)$ $\theta rr = -\tan^{-1}(T/2L)$

If the determination at step 110 is NO, the program proceeds to step 140 where the rear left angle $\theta rl$ and the rear right angle $\theta rr$ are set equal to the front steering angle $\theta f$ multiplied by a predetermined function g(V). FIG. is a graph showing a function g(v) which is negative while the vehicle speed V is a predetermined speed V0 or less, and which decreases in accordance thereto. The rear left angle $\theta rl$ and the rear right angle $\theta rr$ are determined to be in opposite directions with respect to the front steering angle $\theta f$.

From steps 130 and 140, the program proceeds to step 150 where the actual rear left angle Arl detected by the sensor 28L and the actual rear right angle Arr detected by the sensor 28R are read. At subsequent step 160, control values X, Y are set equal to the rear left angle $\theta rl$, the rear right angle $\theta rr$, respectively, minus the actual rear left angle Arl and the actual rear right angle Arr, respectively. At subsequent step 170, the control value X is output to the sensor 26L and the rear left wheel is set to the rear left angle $\theta rl$. At subsequent step 180, the control value Y is output to the sensor 26R and the rear right wheel is set equal to the rear right angle $\theta rr$. Thereafter, the program exits the routine.

As described above, during high speed turning when the determination at step 110 is YES, the rear left angle $\theta rl$ and the rear right angle $\theta rr$ are determined at steps 120 and 130 such that the rear left and right wheels 18L and 18R toe-in, and the actuators 28L and 28R are driven at steps 150 through 180 such that the steering angles of the rear left and right wheels 18L and 18R are set as the angles $\theta rl$ and $\theta rr$. Therefore, the rear left and right wheels 18L and 18R are controlled to toe-in.

Figure 7:
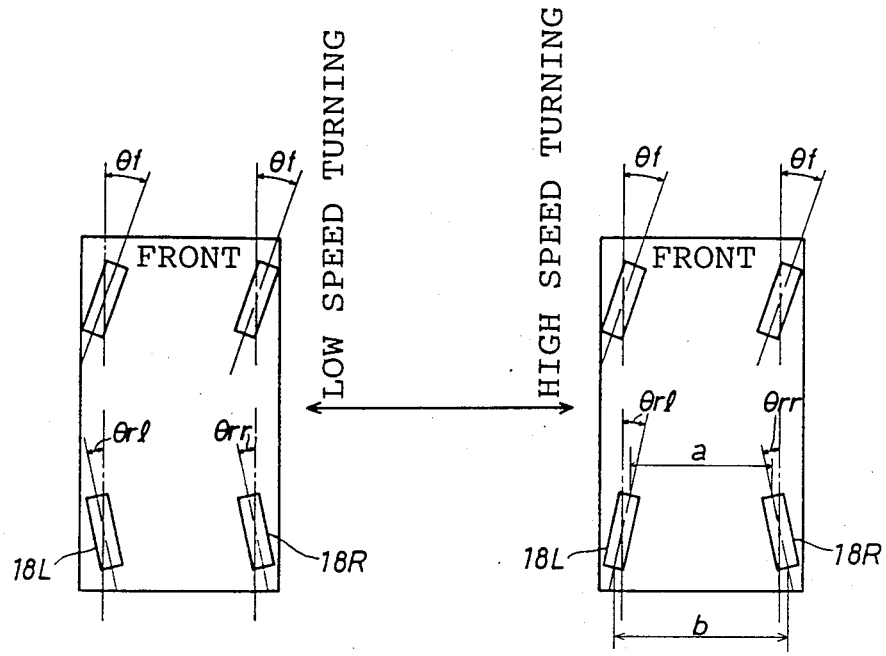
FIG. 7 is a diagramatic view showing the contents of rear steering wheel control.

On the other hand, during low speed turning when the determination at step 110 is NO, the rear left angle $\theta rl$ and the rear right angle $\theta rr$ are determined at step 140 such that the rear left and right wheels 18L and 18R are in reverse phase with the front left and right wheels, and that the actuators 28L and 28R are driven at steps 150 through 180 such that the steering angles of the rear left and right wheels 18L and 18R are set as the angles $\theta rl$ and $\theta rr$. Therefore, as shown in FIG. 7, the rear left and right wheels 18L and 18R are controlled to be in reverse phase with the front wheels.

According to the first embodiment, since the rear left and right wheels 18L and 18R are set to toe-in during high speed turning, reverse cornering forces resulting from the slip angles of the wheels 18L and 18R cancel one another, thereby obtaining quick turning similar to that of prior two wheel steering configurations. Namely the slip angles cause two rear wheels the reverse working forces, i.e. reverse cornering forces, so that the forces are cancelled out.

From the middle to the last period of turning ( from the start of load transference between right and left wheels until the end thereof ), the load is applied to the outside turning wheels ( 18L or 18R ) and turning is under control of the cornering force based upon the slippage angle thereof, resulting in good drivability similar to that of the prior four wheel steering in which front and rear wheels are in the same phase. The quantity of toe-in is controlled to increase in response to the increase of the vehicle speed V and the front steering angle $\theta f$, thereby improving quick turnability and stability according to the driving condition.

As the load transference between wheels during vehicle turning starts earlier than when controlled by a roll steer, turning control at present embodiment is superior to that of roll steer, thereby the turning radius can effectively be smaller.

Moreover, front and inside wheels are in reverse phase of one another, thereby obtaining a small turning radius.

Figure 8:
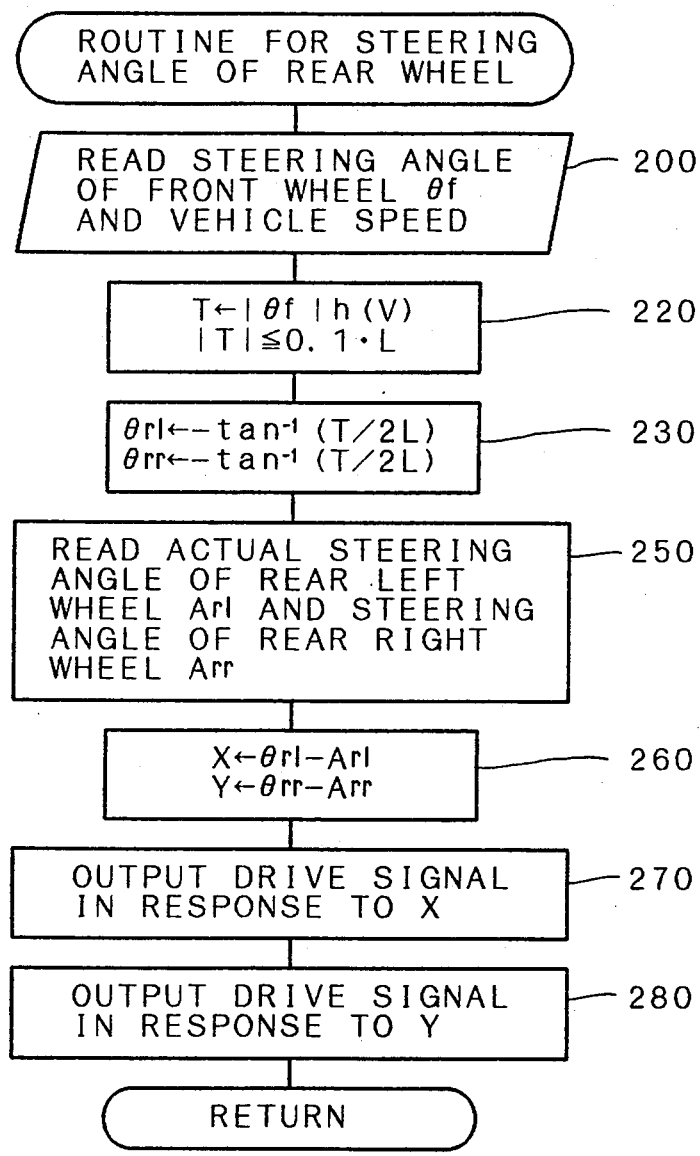
FIG. 8 is a flow chart showing a routine for controlling the steering angle of a rear wheel as executed by an electronic control unit according to a second embodiment.

A second embodiment is similar to the first embodiment except in the control routine for the rear wheels. FIG. 8 is a flow chart showing the routine for controlling the steering angle of the rear wheels as executed by the ECU 70 according to the second embodiment.

Figure 9:
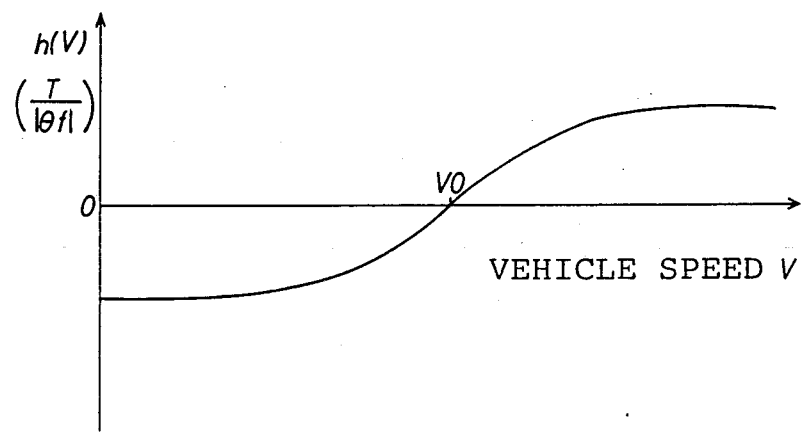
FIG. 9 is a graph showing a function h(v).

Since steps 200, 230, 250, 260, 270 and 280 are similar to the steps 100, 130, 150, 160, 170 and 180 respectively, of the first embodiment, descriptions thereof are omitted. From step 200, the program proceeds to step 220 where a toe quantity T is set to the front steering angle $\theta f$ read at step 200 and multiplied by a predetermined function h(v). FIG. 9 is a graph showing a function h(v) which is positive in value while the vehicle speed V is a predetermined speed V0 or more and which increases in accordance thereto, and which is negative in value while the vehicle speed V is the predetermined speed V0 or less and which decreases in accordance thereto. The toe quantity T is determined such that the rear wheels toe-out when V is less than V0, and such that the rear wheels toe-in when V is V0 or more, T is limited not to exceed 0.1L in absolute value where L represents the rear wheel diameter. At subsequent step 230, the actuators 28L and 28R are driven such that the rear left and right wheels 18L and 18R correspond to the above toe quantity.

Figure 10:
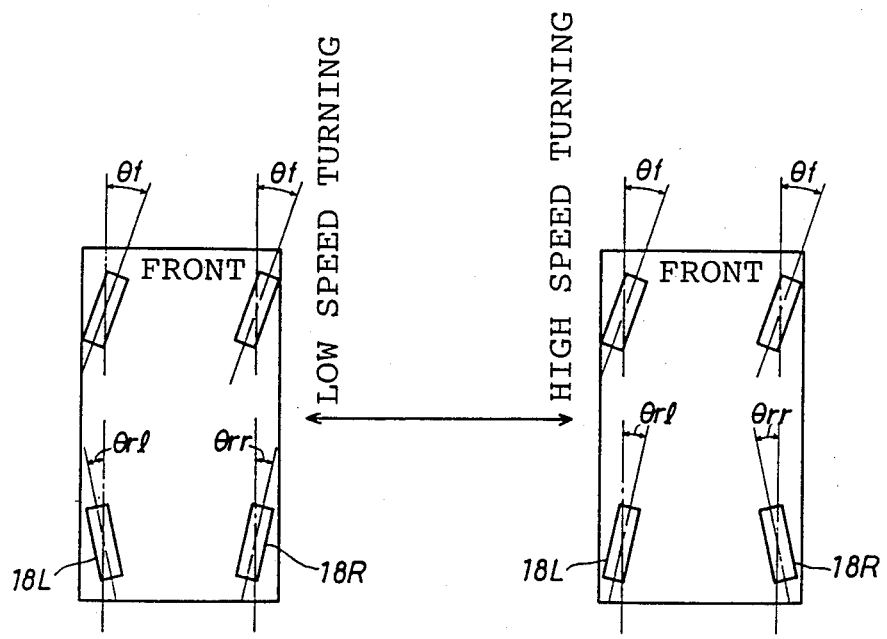
FIG. 10 is a diagramatic view showing the contents of a rear steering wheel control.

According to the second embodiment, as shown in FIG. 10, during low speed turning, the rear left and right wheels 18L and 18R are set to toe-out, during high speed turning, the rear left and right wheels 18L and 18R are set to be toe-in. The similar effect to the first embodiment is obtained during high speed turning while driving stability during low speed and initial turning are also improved as compared with prior four wheel steering.

Since the rear left and right wheels 18L and 18R are set to toe-out during low speed turning, reverse cornering forces resulting from the slip angle of the wheels 18L and 18R cancel one another out, thereby obtaining quick turning similar to that of the prior two wheel steering. The driver feels lateral acceleration with respect to the vehicle, thereby unpleasant forces are avoided.

From the middle to the last period of turning (from start of load transference between the right and left wheels until the end thereof), the load is applied to the outside turning wheels (18L or 18R) and turning is under control of the cornering force based upon the slippage angle thereof, resulting in good drivability similar to that of prior four wheel steering in which the front and rear wheels are in reverse phase.

Figure 11:
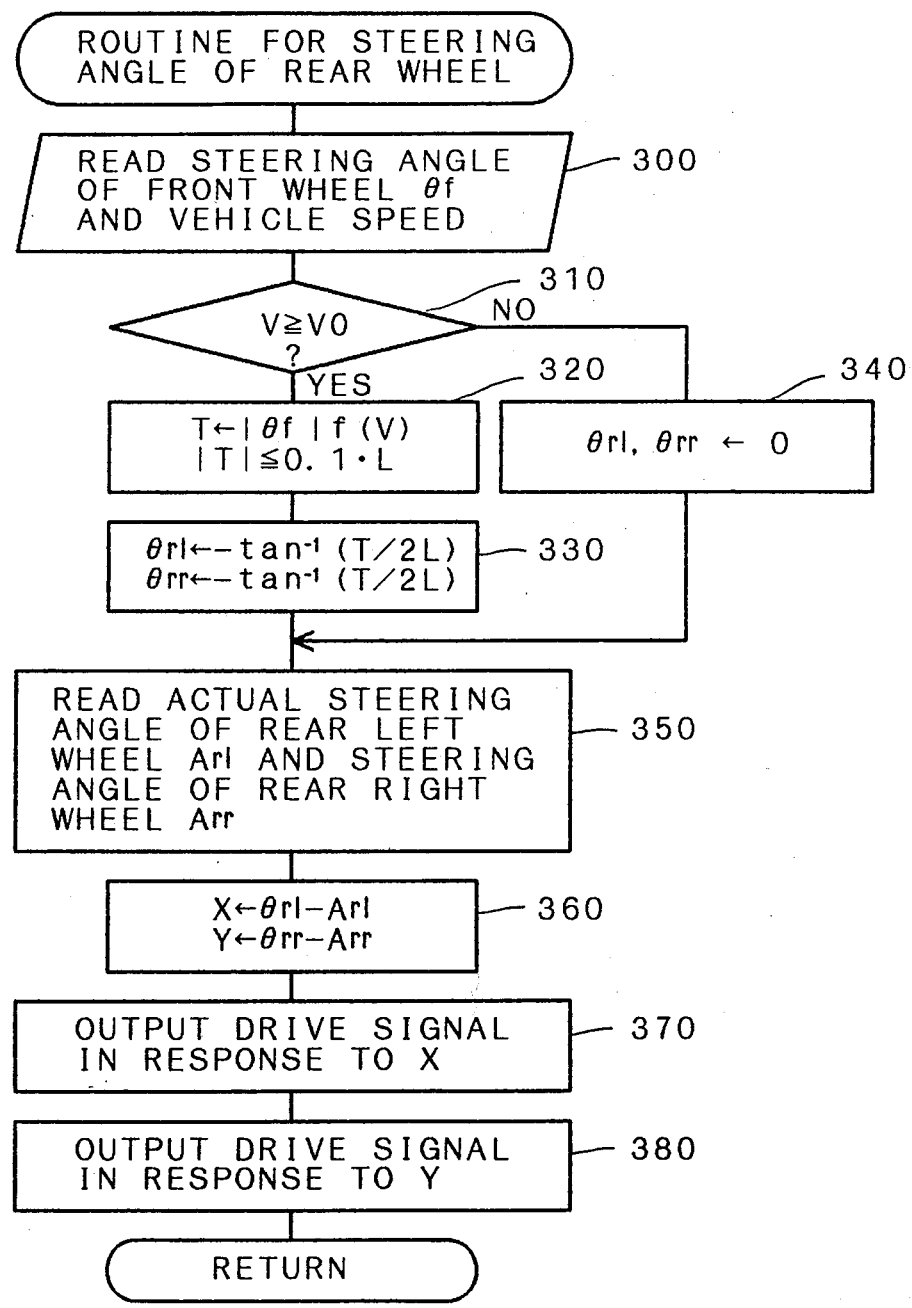
FIG. 11 is a flow chart showing a routine for controlling the steering angle of a rear wheel as executed by an electronic control unit according to a third embodiment.
Figure 12:
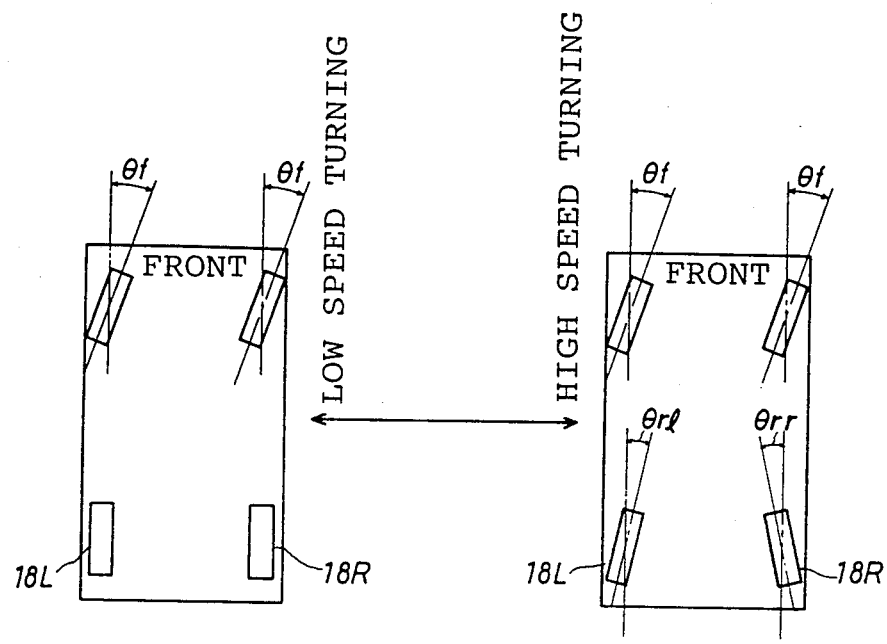
FIG. 12 is a diagramatic view showing the contents of a rear steering wheel control.

A third embodiment is similar to the first embodiment except for the control routine for the rear wheels. FIG. 11 is a flow chart showing the routine for controlling the steering angle and the rear wheel as executed by the ECU 70 according to the third embodiment.

Since steps 300, 310, 320, 330, 350, 360, 370 and 380 are similar to steps 100, 110, 120, 130, 150, 160, 170 and 180, respectively, of the first embodiment shown in FIG. 4, descriptions thereof are omitted. If the determination at step 310 is NO, the program proceeds to step 340 where the rear left angle $\theta rl$ and the rear right angle $\theta rr$ are set at zero and the program proceeds to step 150. According to the third embodiment, the rear left and right wheels 18L and 18R are set to be constant with respect to toe quantity during low speed turning while they are set to toe-in during high speed turning. The similar effect to the first embodiment is obtained during high speed turning while driving stability is also improved as compared with that of the two wheel steering prior art.

The foregoing description of preferred embodiments for the purposes of illustrating the invention is not to be considered as limiting or restricting the invention since many modifications may be made by the exercise of skill in the art without departing from the scope of the invention.

What is claimed is:

1. Apparatus for controlling steering angles of right and left rear wheels comprising:
   means for detecting a vehicle speed and a steering angle of a front wheel;
   means responsive to said detecting means for controlling a toe-in quantity of said rear wheels in relation to said vehicle speed and steering angle of said front wheel during high speed turning, said apparatus including means for increasing the toe-in quantity in accordance with an increase of said vehicle speed and said steering angle of said front wheel.

2. Apparatus for controlling the steering angles of right and left rear wheels according to claim 1, wherein said control means includes means for determining a target steering angle of each rear wheel and for controlling actual detected steering angles toward said target steering angles.

3. Apparatus for controlling the steering angles of right and left rear wheels according to claim 1, wherein said apparatus includes means for controlling the rear wheels to be in reverse phase to the front wheel steering angle during low speed turning.

4. Apparatus for controlling the steering angles of right and left rear wheels according to claim 1, wherein said apparatus includes means for controlling the rear wheels to toe-out during low speed turning.

5. Apparatus for controlling the steering angles of right and left rear wheels according to claim 1, wherein said apparatus includes means for controlling the rear wheels to have a constant toe quantity during low speed turning.

* * * * *